US009277388B2

(12) United States Patent
Hasesaka

(10) Patent No.: US 9,277,388 B2
(45) Date of Patent: Mar. 1, 2016

(54) WIRELESS COMMUNICATION DEVICE, WIRELESS COMMUNICATION NETWORK SYSTEM, INFORMATION PROCESSING METHOD, AND RECORDING MEDIUM RECORDING INFORMATION PROCESSING PROGRAM

(71) Applicant: FUJITSU LIMITED, Kawasaki-shi, Kanagawa (JP)

(72) Inventor: Kiyomi Hasesaka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/635,534

(22) Filed: Mar. 2, 2015

(65) Prior Publication Data
US 2015/0281933 A1 Oct. 1, 2015

(30) Foreign Application Priority Data
Mar. 31, 2014 (JP) .................. 2014-074297

(51) Int. Cl.
*H04M 11/04* (2006.01)
*H04W 4/22* (2009.01)
*H04M 1/725* (2006.01)
*G01W 1/10* (2006.01)

(52) U.S. Cl.
CPC ............ *H04W 4/22* (2013.01); *H04M 1/72519* (2013.01); *G01W 1/10* (2013.01)

(58) Field of Classification Search
CPC . H04W 76/007; H04W 4/22; H04M 1/72519; G01W 1/10
USPC ....... 455/404.1, 404.2, 550.1; 702/3
See application file for complete search history.

(56) References Cited

U.S. PATENT DOCUMENTS

| 6,912,270 | B1 * | 6/2005 | Drury | H04M 11/045 379/40 |
| 7,312,712 | B1 * | 12/2007 | Worrall | G06Q 10/06 340/309.16 |
| 2003/0212493 | A1 * | 11/2003 | Tanahashi | G01W 1/10 702/5 |
| 2005/0027571 | A1 * | 2/2005 | Gamarnik | G06Q 40/08 705/4 |
| 2006/0056411 | A1 | 3/2006 | Badat et al. | |

(Continued)

FOREIGN PATENT DOCUMENTS

| JP | 2001-033567 | 2/2001 |
| JP | 2003-188797 | 7/2003 |

(Continued)

*Primary Examiner* — Dahn Le
(74) *Attorney, Agent, or Firm* — Fujitsu Patent Center

(57) ABSTRACT

A wireless communication device in a wireless communication network system that includes a plurality of wireless communication devices, the inside of the system being divided into zones each having a predetermined geographic area, includes a processing unit that, upon receiving a disaster warning message including predicted position information on an occurrence source of a disaster and disaster-influencing information indicating an area to be influenced by the disaster, calculates a disaster-stricken zone including the occurrence source based on the predicted position information, and an affected zone to be influenced by the disaster based on the disaster-influencing information, and performs any one of a process to transfer data that the own device has and a process to change a transfer route from the own device to a destination device, according to the relationship between a zone in which the own device is positioned, and the disaster-stricken zone and the affected zone.

14 Claims, 21 Drawing Sheets

(56) References Cited

U.S. PATENT DOCUMENTS

| | | | |
|---|---|---|---|
| 2007/0033153 A1* | 2/2007 | Yamanaka | G01V 1/008 706/21 |
| 2012/0158312 A1* | 6/2012 | Nukatsuka | G06Q 10/04 702/23 |
| 2012/0287937 A1* | 11/2012 | Kaya | H04L 45/22 370/401 |
| 2014/0112241 A1* | 4/2014 | Gayrard | H04B 7/18543 370/316 |

FOREIGN PATENT DOCUMENTS

| | | |
|---|---|---|
| JP | 2005-086650 | 3/2005 |
| JP | 2006-087103 | 3/2006 |
| JP | 2009-071564 | 4/2009 |

\* cited by examiner

FIG.8

POSITION INFORMATION/LC MANAGEMENT TABLE

| LC-ID | LATITUDES 1 | LONGI-TUDES 1 | LATITUDES 2 | LONGI-TUDES 2 |
|---|---|---|---|---|
| LC#1 | 120 | 50 | 130 | 60 |
| LC#2 | | | | |
| LC#3 | | | | |
| | | | | |

FIG.9

RISK INFORMATION MANAGEMENT TABLE

| DEGREE OF RISK | NUMBER OF AFFECTED LCs | DIRECTION |
|---|---|---|
| 0.1 | 1 | 001 |
| 1.1 | | |
| 3.0 | | |
| | | |

DIRECTION
EXAMPLE)
001=SOUTH
002=NORTH
003=EAST
004=WEST
005= SOUTHEAST
006= SOUTHWEST
007=NORTHEAST
008=NORTHWEST

FIG.10

AP-LC MANAGEMENT TABLE

| AP-ID | BELONGING LC |
|-------|--------------|
| AP#10 | LC#2 |

FIG.11

DISASTER-STRICKEN LC/AFFECTED LC
MANAGEMENT TABLE

| DISASTER-STRICKEN LC-ID | AFFECTED LC-ID(1) | AFFECTED LC-ID(2) |
|---|---|---|
| LC#1 | LC#2 | FFFF |

FIG.12

AP/BR ROUTE MANAGEMENT TABLE

| ROUTE-ID | STATUS | N (NUMBER OF LCs TO PASS THROUGH) | HOP 1 (LC-ID, NUMBER OF BR, BRID···) | HOP 2 (LC-ID, NUMBER OF BR, BRID···) | | DEST. AP |
|---|---|---|---|---|---|---|
| ROUTE 1 | 0 | 7 | LC#1, 1, BR#1 | LC#2, 2, BR#2, BR#3 | | AP#2 |
| ROUTE 2 | 1 | 15 | LC#11, 1, BR#11 | LC#12, 2, BR#12, BR#13 | | AP#3 |
| ROUTE 3 | 2 | 30 | | | | AP#4 |
| FFFF | - | | | | | |

FIG.13

ROUTE-WITHOUT-DISASTER-STRICKEN LC/
RISK CALCULATION RESULT MANAGEMENT TABLE

| ROUTE-ID | MAXIMUM RISK PREDICTION VALUE |
|---|---|
| ROUTE 1 | xxxxx |
| ROUTE 3 | yyyyy |
| FFFF | |

FIG.14

SWITCHING RISK THRESHOLD VALUE
MANAGEMENT TABLE

|  | SWITCHING RISK THRESHOLD VALUE |
|---|---|
| VALUE | xxxxx |

FIG.15

LANDFORM INFORMATION MANAGEMENT TABLE

| LC-ID | LC RISK (i) | LANDFORM RISK(Ef(i)) |
|---|---|---|
| LC#1 | 2.0 | 3.0 |
| LC#2 | 2.0 | 4.0 |

EXAMPLE: LC RISK
1.0=MINIMUM VALUE (1.0 UNIT)
21 =MAXIMUM VALUE

EXAMPLE: LANDFORM VALUE
1.0=MINIMUM VALUE(1.0 UNIT)
20 =MAXIMUM VALUE

FIG.17

LC RISK FACTOR TABLE

| FACTOR | RANK | EVALUATION SCORE |
|---|---|---|
| DEGREE OF TEMPERATURE CHANGE1 | AVERAGE OF LESS THAN 10°PER OUR | 1 |
| DEGREE OF TEMPERATURE CHANGE 2 | AVERAGE OF EQUAL TO OR MORE THAN 10° PER HOUR | 2 |
| PRECIPITATION1 | 20 mm TO LESS THAN 30 mm | 1 |
| PRECIPITATION2 | 30 mm TO LESS THAN 40 mm | 2 |
| SNOW ACCUMULATION 1 | AVERAGE OF LESS THAN 30cm PER HOUR | 1 |
| SNOW ACCUMULATION 2 | AVERAGE OF 30cm TO LESS THAN 50cm PER HOUR | 2 |
| SNOW ACCUMULATION 3 | AVERAGE OF 50cm TO LESS THAN 70cm PER HOUR | 3 |
| SNOW ACCUMULATION 4 | AVERAGE OF EQUAL TO OR MORE THAN 70cm PER HOUR | 4 |
| WIND VELOCITY 1 | LESS THAN 20m | 1 |
| WIND VELOCITY 2 | EQAUL TO OR MORE THAN 20m | 2 |
| SNOW DEPTH 1 | LESS THAN 50cm | 1 |
| SNOW DEPTH 2 | EQUAL TO OR MORE THAN 50cm | 2 |
| CHANGE IN SNOW QUALITY 1 | WEAK | 1 |
| CHANGE IN SNOW QUALITY 2 | STRONG | 2 |

LC RISK = MULTIPLICATION OF DEGREE OF TEMPERATURE CHANGE, PRECIPITATION, SNOW ACCUMULATION, WIND DIRECTION, WIND VELOCITY, SNOW DEPTH, AND CHANGE IN SNOW QUALITY

FIG. 18

LANDFORM RISK FACTOR TABLE

| FACTOR | RANK | EVALUATION SCORE |
|---|---|---|
| INCLINE 1 | LESS THAN 10° | 1 |
| INCLINE 2 | 10° TO LESS THAN 20° | 3 |
| INCLINE 3 | 20° TO LESS THAN 30° | 5 |
| INCLINE 4 | 30° TO LESS THAN 40° | 7 |
| INCLINE 5 | EQUAL TO OR MORE THAN 40° | 10 |
| VEGETATION 1 | BARE LAND, GRASSLAND, OR TREE HEIGHT OF LESS THAN ONE | 10 |
| VEGETATION 2 | LOW TREE: DENSITY OF 20% TO LESS THAN 50% | 9 |
| VEGETATION 3 | LOW TREE: DENSITY OF 50% TO LESS THAN 70% | 8 |
| VEGETATION 4 | LOW TREE: DENSITY OF 70% TO LESS THAN 100% | 7 |
| VEGETATION 5 | MIDDLE-HEIGHT TREE: 20% TO LESS THAN 50% | 6 |
| VEGETATION 6 | MIDDLE-HEIGHT TREE: 50% TO LESS THAN 70% | 5 |
| VEGETATION 7 | MIDDLE-HEIGHT TREE: 70% TO LESS THAN 100% | 4 |
| VEGETATION 8 | HIGH TREE: 20% TO LESS THAN 50% | 3 |
| VEGETATION 9 | HIGH TREE: EQUAL TO OR MORE THAN 50% | 1 |

LANDFORM RISK
= INCLINE i (i = 1 TO 5) × VEGETATION j (j = 1 TO 9)

WIRELESS COMMUNICATION DEVICE, WIRELESS COMMUNICATION NETWORK SYSTEM, INFORMATION PROCESSING METHOD, AND RECORDING MEDIUM RECORDING INFORMATION PROCESSING PROGRAM

CROSS-REFERENCE TO RELATED APPLICATION

This application is based upon and claims the benefit of priority of the prior Japanese Patent Application No. 2014-074297, filed on Mar. 31, 2014, the entire contents of which are incorporated herein by reference.

FIELD

The present invention relates to a wireless communication device, a wireless communication network system, an information processing method, and an information processing program, for performing a handling process in the occurrence of a natural disaster.

BACKGROUND

For example, in a region such as mountain region where it is difficult to build wired communications equipment such as a fiber-optic line due to its landform or environment, a wireless communication network may be constructed using access points (APs) of Wi-Fi (Wireless Fidelity) or the like. In addition, in the wireless communication network, for example, the APs may collect and accumulate log information from security cameras and the like, or may collect log information on user access for a coupon distribution service or the like.

FIG. 1 is a diagram illustrating an example of a landform of a mountain region where a wireless network is constructed. In the example illustrated in FIG. 1, the mountain region includes portions used as ski areas, and predicted hazardous zones where an avalanche is expected to occur, an off-limits zone that common people are forbidden to enter, a no-entry zone, and the like. In the example illustrated in FIG. 1, the wireless communication network is constructed so as to cover the ski areas.

FIG. 2 is a diagram illustrating an example of the system configuration of a wireless communication network that is constructed so as to cover the ski areas illustrated in FIG. 1. The wireless communication network includes, in addition to the ski areas, a plurality of APs P1 that are installed at predetermined positions in the predicted hazardous zones and the like around the ski areas, and a monitoring operation server P2 located at a position that is away from the ski areas and is not influenced by an avalanche.

In accordance with the intended use, for example, the AP may operate as an access point that transmits monitoring signals such as a beacon signal and connects a user terminal, or may operate as a bridge that transmits no monitoring signal and relays wireless communication between access points. The AP operating as a bridge is denoted by "BR (BRidge)" in the drawing. Hereafter, an AP denoted by merely an "AP" means that there is no distinction between an AP operating as an access point and an AP operating as a bridge. When these are distinguished, these are denoted by, for example, "AP#1" or "BR#1" with signs used to identify the devices.

The monitoring operation server P2 monitors the wireless communication network. For example, the monitoring operation server P2 periodically performs the process of fault detection, and upon detecting a fault in any AP in the wireless communication network, notifies APs in the wireless communication network of the fault. This enables each AP receiving the fault detection to switch from a route in operation to a backup route to maintain a service for a user terminal or the connection.

In addition, upon receiving an avalanche warning message from an avalanche predicting system P3, the monitoring operation server P2 notifies the APs in the wireless communication network of the avalanche warning message. The avalanche predicting system P3 is, for example, a system that predicts the occurrence of an avalanche from a landform, climate, the states of snow, and the like. In addition, the monitoring operation server P2 also takes the role of connecting the wireless communication network and the Internet.

Patent Document

[Patent document 1] Japanese Patent Laid-Open No. 2009-71564
[Patent document 2] Japanese Patent Laid-Open No. 2006-87103

However, such a wireless communication network illustrated in FIG. 2 does not perform a handling process for a case of the occurrence of an avalanche and may come under, for example, the following influence when an avalanche occurs.

FIG. 3 is a diagram illustrating an example of a case where an avalanche occurs in an area covered by the wireless communication network illustrated in FIG. 2. The area covered by the wireless communication network is divided into blocks, and each block is referred to as an LC (LoCation). Each LC is given an identification number.

An LC including the occurrence origin of an avalanche is referred to as a disaster-stricken LC. In addition, in the case of an avalanche, snow slips off over a slope of mountain, which also influences an LC positioned closer to the foot of the mountain than the occurrence origin. An LC that does not include the occurrence origin of an avalanche but is influenced by the avalanche is referred to as an affected LC.

For example, an AP (e.g., AP#10 in FIG. 3) included in a disaster-stricken LC or an affected LC is moved from its installed position due to an avalanche, or breaks in the worst case. For example, when the AP#10 is moved from its installed position, communication via the AP#10 may be cut off. In addition, when the AP#10 breaks, in addition to the communication cut-off, data on the affected LC collected by the AP#10 may disappear. Data saved in a nonvolatile storage medium such as a hard disk can be recovered by collecting the storage medium after the disaster if the storage medium itself is not broken. However, the data saved in the volatile storage medium disappears by power-down due to the breakdown of the AP#10, and becomes unrecoverable.

In addition, for example, even an AP (e.g., AP#1 in FIG. 3) that is not included in a disaster-stricken LC and an affected LC may have a route in operation to the monitoring operation server P2, an AP (e.g., a disaster-stricken BR in FIG. 3) on which is included in the disaster-stricken LC or the affected LC. In this case, a service and the connection to the Internet that are provided via the monitoring operation server P2 may become unavailable until the AP#1 receives the notification of fault detection from the monitoring operation server P2 and switches to a backup route.

SUMMARY

One aspect of the present invention is, a wireless communication device in a wireless communication network system that includes a plurality of wireless communication devices connected to one another by wireless communication, the inside of the system being divided into zones each having a geographic area, the wireless communication device including a processing unit that, upon receiving a disaster warning message including predicted position information on an occurrence source of a disaster and disaster-influencing information indicating an area to be influenced by the disaster, calculates a disaster-stricken zone including the occurrence source based on the predicted position information, and an affected zone to be influenced by the disaster based on the disaster-influencing information, and performs any one of a process to transfer data that an own device has, and a process to change a transfer route from the own device to a destination device, according to a relationship between a zone in which the own device is positioned, and the disaster-stricken zone and the affected zone.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is an example of a position information/LC management table that is held in a position information/LC management DB;

FIG. 9 is an example of a risk information management table that is held in a risk information management DB;

FIG. 10 is an example of an AP-LC management table that is held in an AP-LC management DB;

FIG. 11 is an example of a disaster-stricken LC/affected LC management table that is held in a disaster-stricken LC/affected LC management DB;

FIG. 12 is an example of an AP/BR route management table that is held in an AP/BR route management DB;

FIG. 13 is an example of a route-without-disaster-stricken LC/risk calculation result management table that is held in a route-without-disaster-stricken LC/risk calculation result management DB;

FIG. 14 is an example of a switching risk threshold value management table that is held in a switching risk threshold value management DB;

FIG. 15 is an example of a landform information management table that is held in a landform information management DB;

FIG. 17 is an example of an LC risk factor table that is held in an LC risk factor DB;

FIG. 18 is an example of a landform risk factor table that is held in a landform risk factor DB;

DESCRIPTION OF EMBODIMENT

An embodiment of the present invention will be described below with reference to the drawings. A configuration of the following embodiment is described by way of example, and the present invention is not limited to the configuration of the embodiment.

First Embodiment

Figure 1:
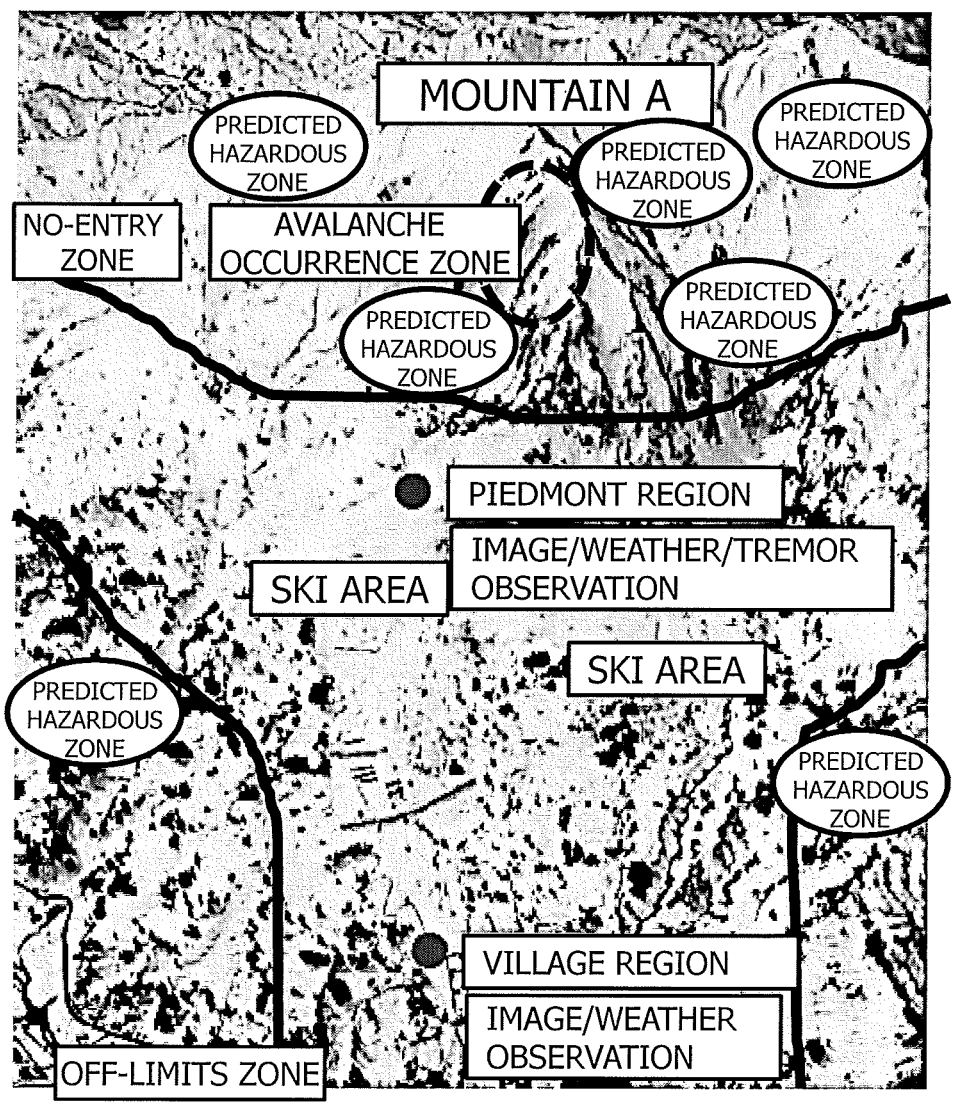
FIG. 1 is a diagram illustrating an example of a landform of a mountain region where a wireless network is constructed.
Figure 2:
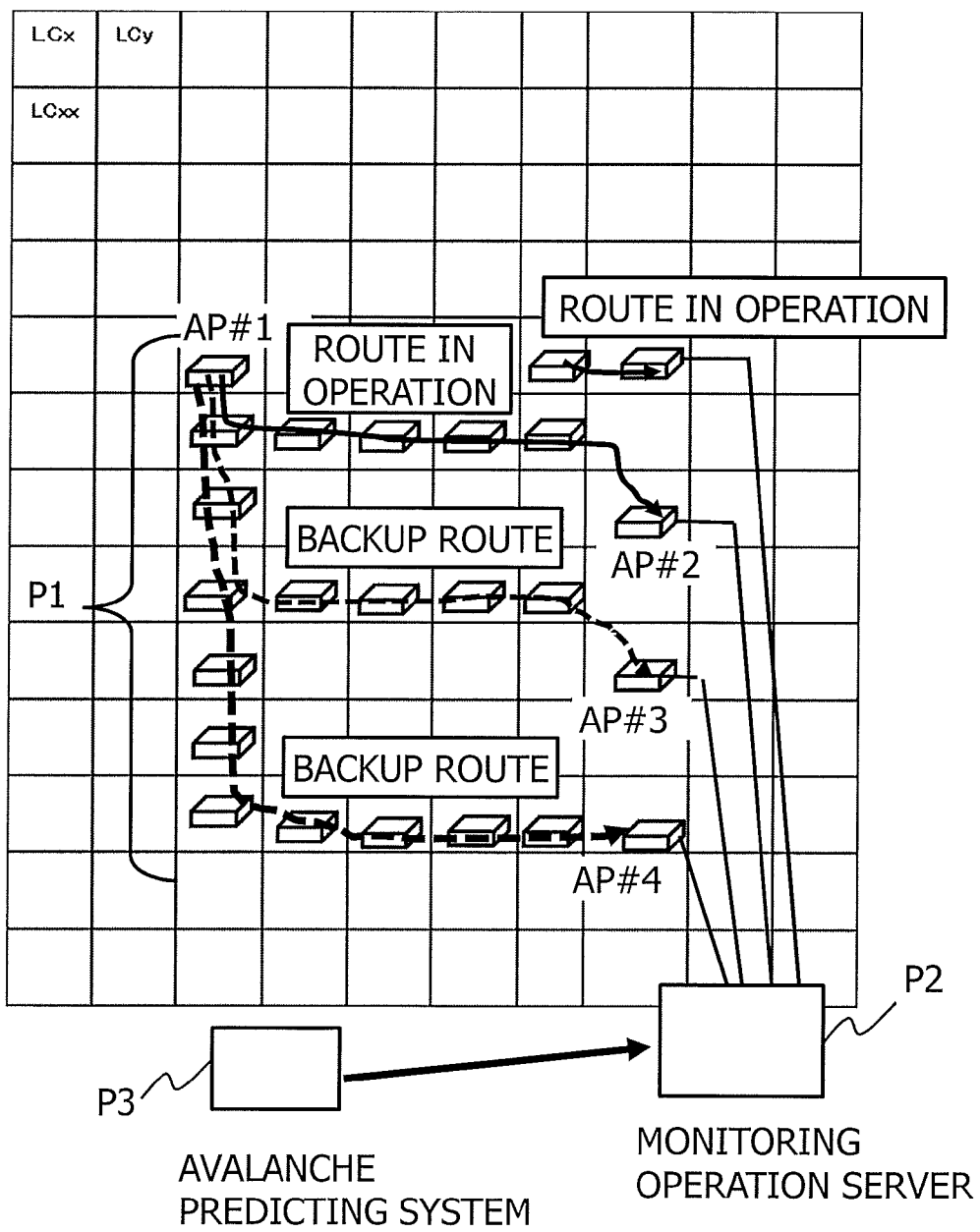
FIG. 2 is a diagram illustrating an example of a system configuration of a wireless communication network that is constructed so as to cover a ski area illustrated in FIG. 1.
Figure 3:
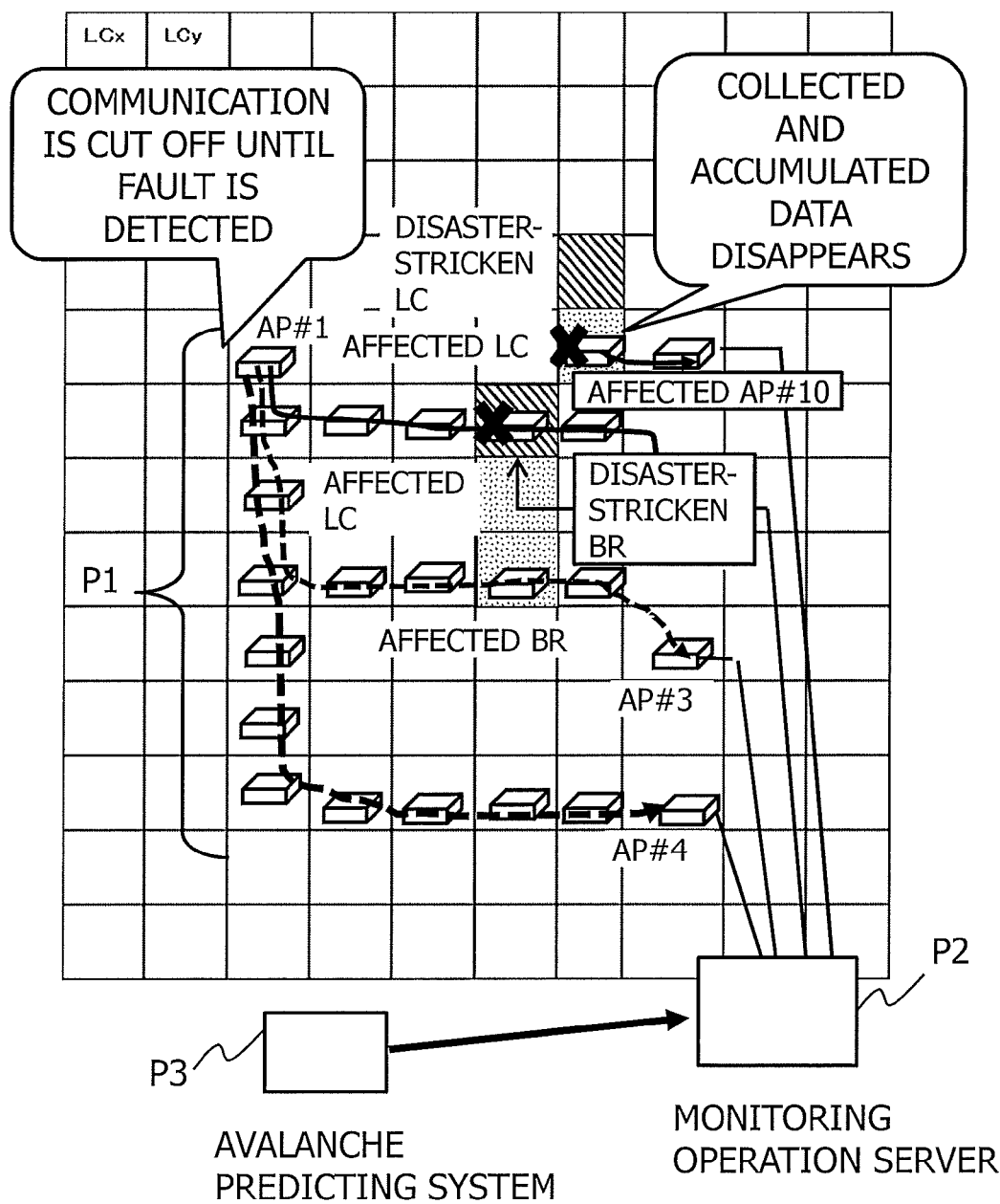
FIG. 3 is a diagram illustrating an example of a case where an avalanche occurs in an area covered by the wireless communication network illustrated in FIG. 2.
Figure 4:
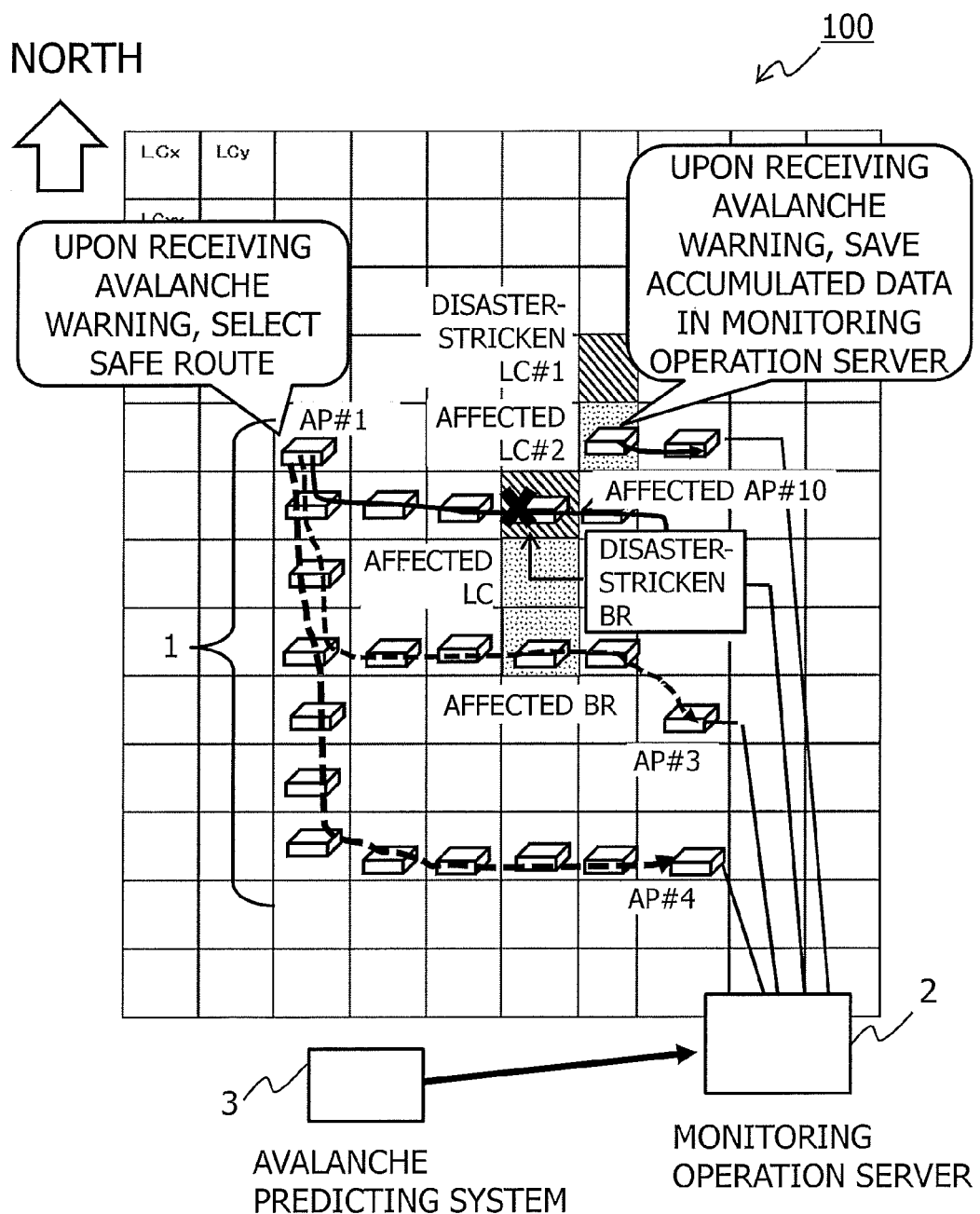
FIG. 4 is a diagram illustrating an example of a configuration of a wireless communication network system according to a first embodiment.

FIG. 4 is a diagram illustrating an example of a configuration of a wireless communication network system according to a first embodiment. A wireless communication network system 100 according to the first embodiment includes a plurality of APs 1, and a monitoring operation server 2 that monitors the APs 1. The wireless communication network system 100 is, for example, a network that is constructed in a region such as a mountain region where it is difficult to build equipment for a wired network.

In the wireless communication network system 100, an AP#1, AP#2, AP#3, AP#4, and AP#10 among the APs 1 operate as access points, and the other APs 1 operate as bridges. In addition, the APs 1 are connected to one another by radio waves. The AP#10, AP#2, AP#3, and AP#4 are connected to the monitoring operation server 2 by wire cables, and these connections are in a safety zone that is not influenced by avalanche.

In addition, the wireless communication network system 100 is divided into rectangular LCs. Note that the shape of LCs is not limited to rectangles, and may be any shape in conformity with a landform where the wireless communication network system 100 is constructed as long as the areas of the LCs do not overlap. In addition, the sizes of the LCs are not limited, and may be identical or different.

The monitoring operation server 2 performs, for example, keep-alive confirmation for the APs 1, in response to the reception of predetermined messages from the APs 1. The monitoring operation server 2 also takes the role of a gateway device that connects the wireless communication network system 100 and the Internet. In addition, the monitoring operation server 2 is connected to an avalanche predicting system 3 through a private line or the Internet, and upon receiving an avalanche warning message from the avalanche predicting system 3, notifies the APs 1 of the avalanche warning message.

The avalanche predicting system 3 is, for example, a system that is operated by government and municipal offices, research institutions, private companies, or the like, and predicts avalanches. The avalanche predicting system 3 predicts avalanches by means of a predetermined algorithm with minute conditions such as a landform, the state of snow, and climate. When the occurrence of an avalanche is predicted, the avalanche predicting system 3 transmits an avalanche warning message to the monitoring operation server 2.

The avalanche warning message contains, for example, position information on the occurrence origin of the avalanche, a degree of risk that indicates the magnitude of the avalanche, and the like. The position information on the occurrence origin of the avalanche is expressed by, for example, a latitude and a longitude. The degree of risk is expressed by, for example, a number calculated by digitizing avalanche-occurrence factors individually and using a predetermined function or the like. The degree of risk is an example of "disaster-influencing information."

In the first embodiment, upon receiving an avalanche warning message, the AP 1 calculates a disaster-stricken LC and an affected LC based on position information and a degree of risk contained in the avalanche warning message, determines whether or not the disaster-stricken LC or the affected LC is an LC in which an own device is included, and performs an avalanche warning handling process. Hereafter, the disaster-stricken LC will refer to an LC that is determined to include the occurrence origin of an avalanche from an analysis result of the position information contained in the avalanche warning message. In addition, the affected LC will refer to an LC that is determined to be influenced by the avalanche from an analysis result of the position information and the degree of risk contained in the avalanche warning message. Note that the APs 1 hold in advance a DB (Data Base) in which numerical value of degree of risks are associated with areas to be influenced by an avalanche, and can identify a disaster-stricken LC and thereafter identify an affected LC by using the degree of risk and the DB. The details thereof will be described hereafter.

(1) Avalanche Warning Handling Process performed by AP belonging to Disaster-Stricken LC or Affected LC An AP 1 belonging to a disaster-stricken LC or an affected LC transmits data that the AP 1 collects and accumulates to the monitoring operation server 2 and the monitoring operation server 2 saves this data, because the data may disappear. This saves the data collected and accumulated by the LC in the monitoring operation server 2 as of the reception of an avalanche warning message, before the occurrence of an avalanche, which enables to prevent the data from disappearing.

(2) Avalanche Warning Handling Process performed by AP belonging to neither Disaster-Stricken LC nor Affected LC An AP 1 belonging to neither a disaster-stricken LC nor an affected LC extracts a route that is not to be influenced by an avalanche from among all the routes to the monitoring operation server 2, and if a plurality of routes not to be influenced by the avalanche are extracted, selects the safer route from among the routes. The route not to be influenced by an avalanche specifically refers to a route all the APs 1 on which belong to neither a disaster-stricken LC nor an affected LC. In addition, the safer route refers to a route having a less possibility of the occurrence of an avalanche.

This enables even an AP 1 belonging to neither disaster-stricken LC nor affected LC to switch to a route having a less possibility of the occurrence of an avalanche as of the reception of an avalanche warning message, before the occurrence of the avalanche, which enables preventing communication from being cut off at the time of the occurrence of the avalanche.

<Device Configuration>
(Configuration of AP)

Figure 5:
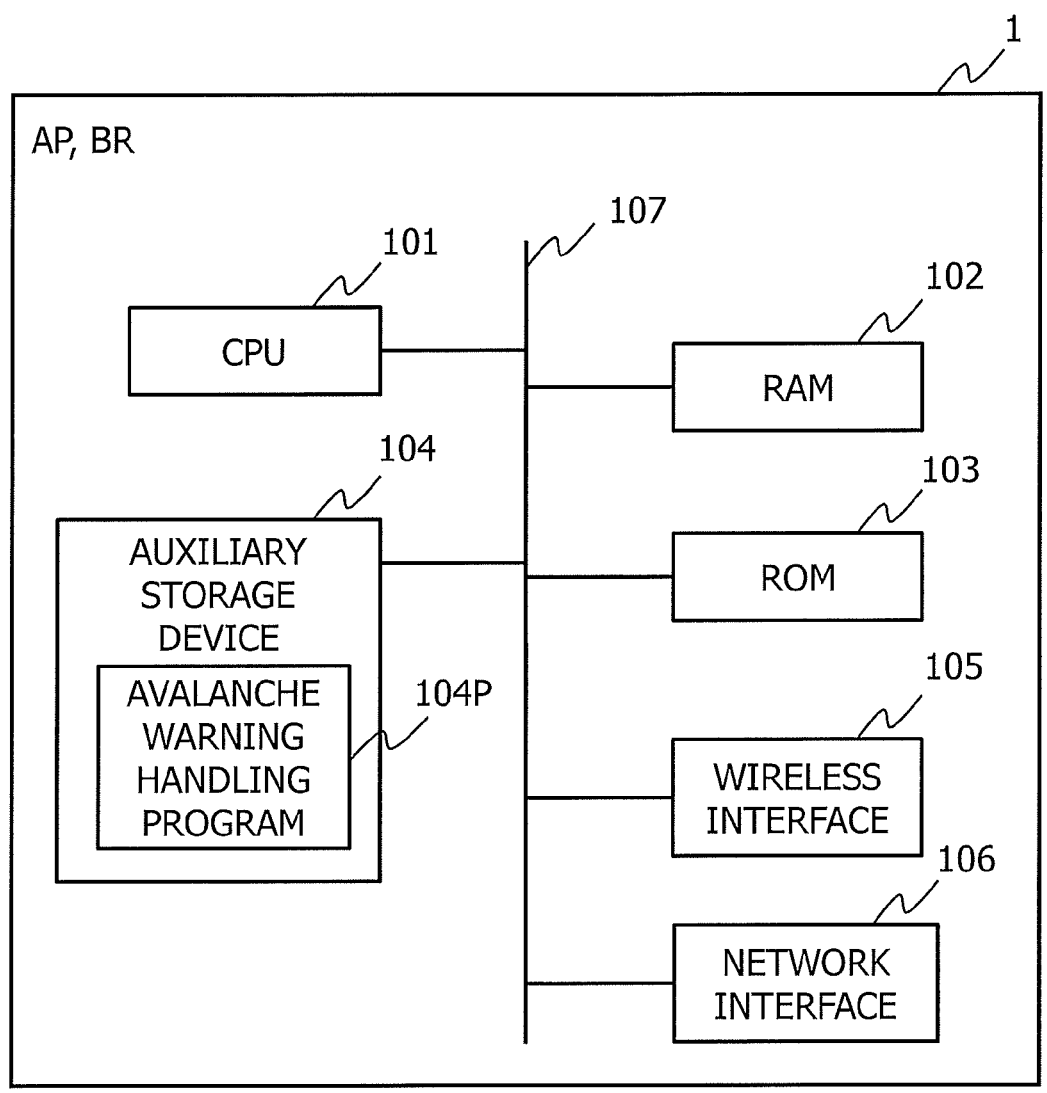
FIG. 5 is a diagram illustrating an example of a hardware configuration of an AP.

FIG. 5 is a diagram illustrating an example of a hardware configuration of the AP 1. The AP 1 includes a CPU (Central Processing Unit) 101, a RAM (Random Access Memory) 102, a ROM (Read Only Memory) 103, an auxiliary storage device 104, a wireless interface 105, and a network interface 106, which are electrically connected by a bus 107.

The CPU 101 loads an OS or various application programs held in the ROM 103 or the auxiliary storage device 104 into the RAM 102 and executes them to perform various processes. The number of included CPUs 101 is not limited to one, and may be two or more.

The RAM 102 is a volatile storage medium that provides a storage area used to load the programs stored in the ROM 103 or the auxiliary storage device 104 and a working area for the CPU 101, and is used as a buffer. The RAM 102 is, for example, a semiconductor memory such as a DRAM (Dynamic RAM), an SRAM (Static RAM), and an SDRAM (Synchronous DRAM). The ROM 103 is a nonvolatile storage medium that holds programs such as a BIOS (Basic Input/Output System).

The auxiliary storage device 104 stores various programs, and data that the CPU 101 uses when executing the programs. The auxiliary storage device 104 is, for example, a nonvolatile storage medium such as an EPROM (Erasable Programmable ROM), or an HDD (Hard Disk Drive). The auxiliary storage device 104 holds, for example, an operating system (OS), an avalanche warning handling program 104P, and the other various application programs. The avalanche warning handling program 104P is, for example, a program used to perform processes in the case of the reception of an avalanche warning message such as the processes of the above-described (1) and (2). The avalanche warning handling program 104P is an example of an "information processing program."

The wireless interface 105 is, for example, a wireless communication circuit of Wi-Fi. The AP 1 is connected to the other AP 1 and a user terminal through the wireless interface 105. The network interface 106 is, for example, a circuit used to connect a cable of a wired network circuit such as an optical cable and a LAN (Local Area Network) cable. The AP 1 is, for example, connected to the monitoring operation server 2 through the network interface 106. Therefore, the network interface 106 can be omitted from an AP 1 that is not connected to the monitoring operation server 2.

Note that the hardware configuration of the AP 1 illustrated in FIG. 5 is an example and not limited to the above, and the components thereof can be omitted, substituted, and added as appropriate according to the embodiment. For example, the AP 1 may include a removable recording medium driving device, and may use removable recording media such as an SD card as auxiliary storage devices. In addition, the AP 1 may be connected to a monitoring camera to collect and accumulate images from the camera.

Figure 6:
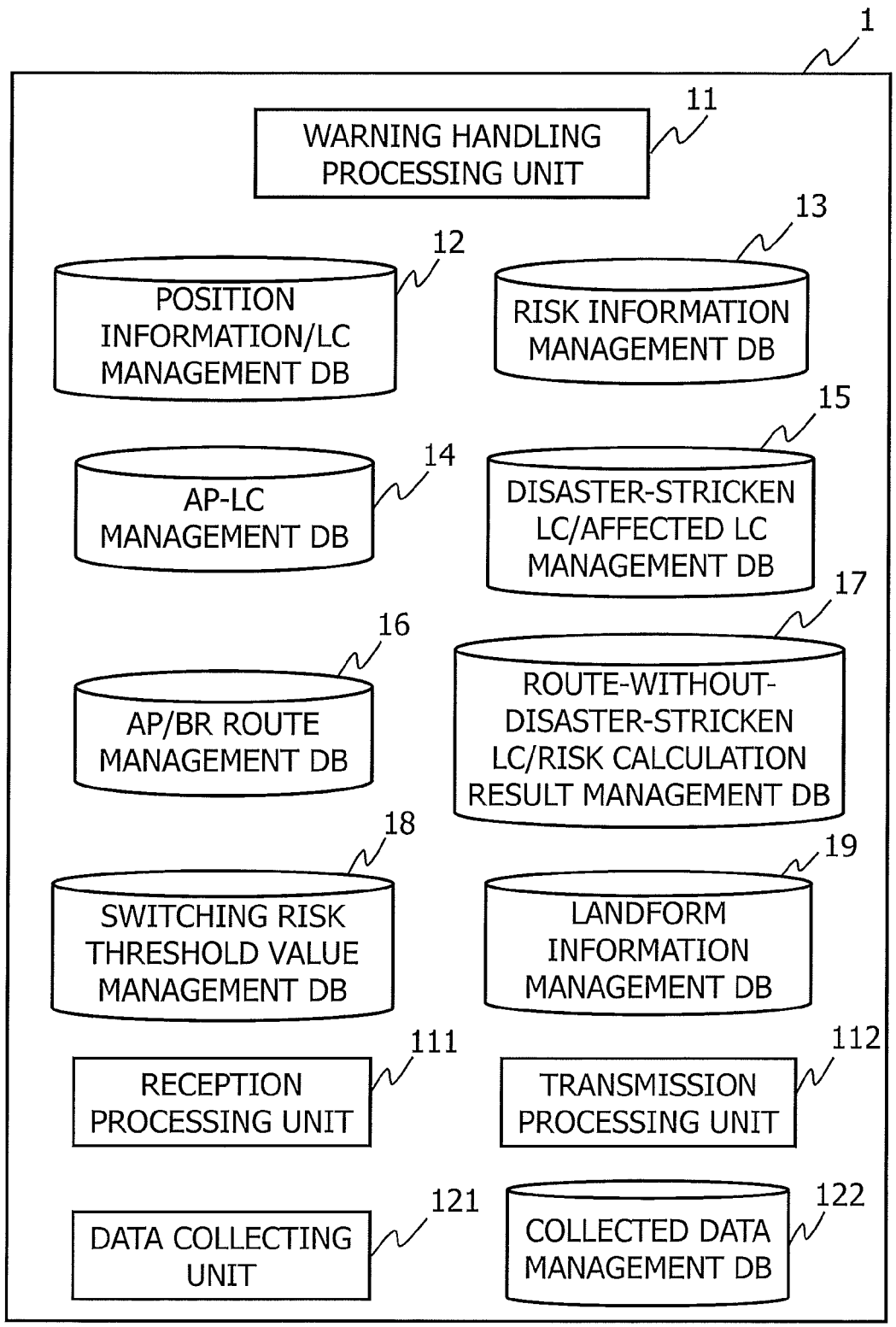
FIG. 6 is a diagram illustrating an example of a functional configuration of the AP.

FIG. 6 is a diagram illustrating an example of the functional configuration of the AP 1. The AP 1 causes the CPU 101 to execute the avalanche warning handling program 104P to perform the process of a warning handling processing unit 11. In addition, the installation or execution of the avalanche warning handling program 104P creates a position information/LC management database 12, a risk information management DB 13, an AP-LC management DB 14, a disaster-stricken LC/affected LC management DB 15, an AP/BR route management DB 16, a route-without-disaster-stricken LC/risk calculation result management DB 17, a switching risk threshold value management DB 18, and a landform information management DB 19, in the storage area of the auxiliary storage device 104. Note that at least some of processing units of the AP 1 illustrated in FIG. 6 may be hardware circuits. The AP 1 is an example of a "wireless communication device."

In addition, the AP 1 causes, for example, the CPU 101 to execute a data collecting program stored in the auxiliary storage device 104 to perform the process of a data collecting unit 121. In addition, the installation or execution of the data collecting program creates a collected data management DB 122 in the storage area of the auxiliary storage device 104. In addition, the collected data management DB 122 uses a part of the storage area of the RAM 102. The storage area of the RAM 102 is an area to hold collected data that is to be stored in the storage area of the auxiliary storage device 104 afterward.

The data collecting unit 121 stores, for example, an access log of a user, and data that is collected by a sensor such as monitoring camera in the collected data management DB 122. In addition, the data collecting unit 121 transmits, for example, data stored in the collected data management DB 122 to the monitoring operation server 2 on a predetermined cycle. The transmitted data may be allowed to be deleted from the collected data management DB 122.

In the collected data management DB 122, for example, the access log of a user, image data from a monitoring camera, data collected by the other sensor, and the like are stored. The collected data management DB 122 is an example of a "second storage unit."

A reception processing unit 111 and a transmission processing unit 112 are each one of the functions of the OS, and are interfaces between applications such as the avalanche warning handling program 104P, and middleware and the OS. For example, the reception processing unit 111 receives an avalanche warning message, which is data converted by the OS from an electric signal, the electric signal that is converted by the wireless interface 105 from received radio waves, and outputs the avalanche warning message to the warning handling processing unit 11. For example, the transmission processing unit 112 transmits data to be stored in the collected data management DB 122, which is read by the warning handling processing unit 11 in response to the reception of an avalanche warning message, to the monitoring operation server 2. The data transmitted from the transmission processing unit 112 is, for example, transmitted after converted by the OS from the data into electric signals, and converted by the wireless interface 105 from the electric signals into radio waves.

The warning handling processing unit 11 calculates, upon receiving an avalanche warning message, a disaster-stricken LC and an affected LC and determines whether or not the own device is positioned in the disaster-stricken LC or the affected LC to perform the avalanche warning handling process. If the own device is positioned in the disaster-stricken LC or the affected LC, the warning handling processing unit 11 reads data stored in the collected data management DB 122, and transmits the data to the monitoring operation server 2 through the transmission processing unit 112, as the avalanche warning handling process.

If the own device is positioned in neither disaster-stricken LC nor affected LC, the warning handling processing unit 11 performs the following process as the avalanche warning handling process. First, the warning handling processing unit 11 extracts a route which includes no AP positioned in the disaster-stricken LC or the affected LC, from among all the routes to the monitoring operation server 2. If a plurality of such routes are extracted, warning handling processing unit 11 selects a route having less possibility of being influenced by an avalanche, that is, less possibility of the occurrence of an avalanche. The warning handling processing unit 11 is an example of a "processing unit."

Figure 7:
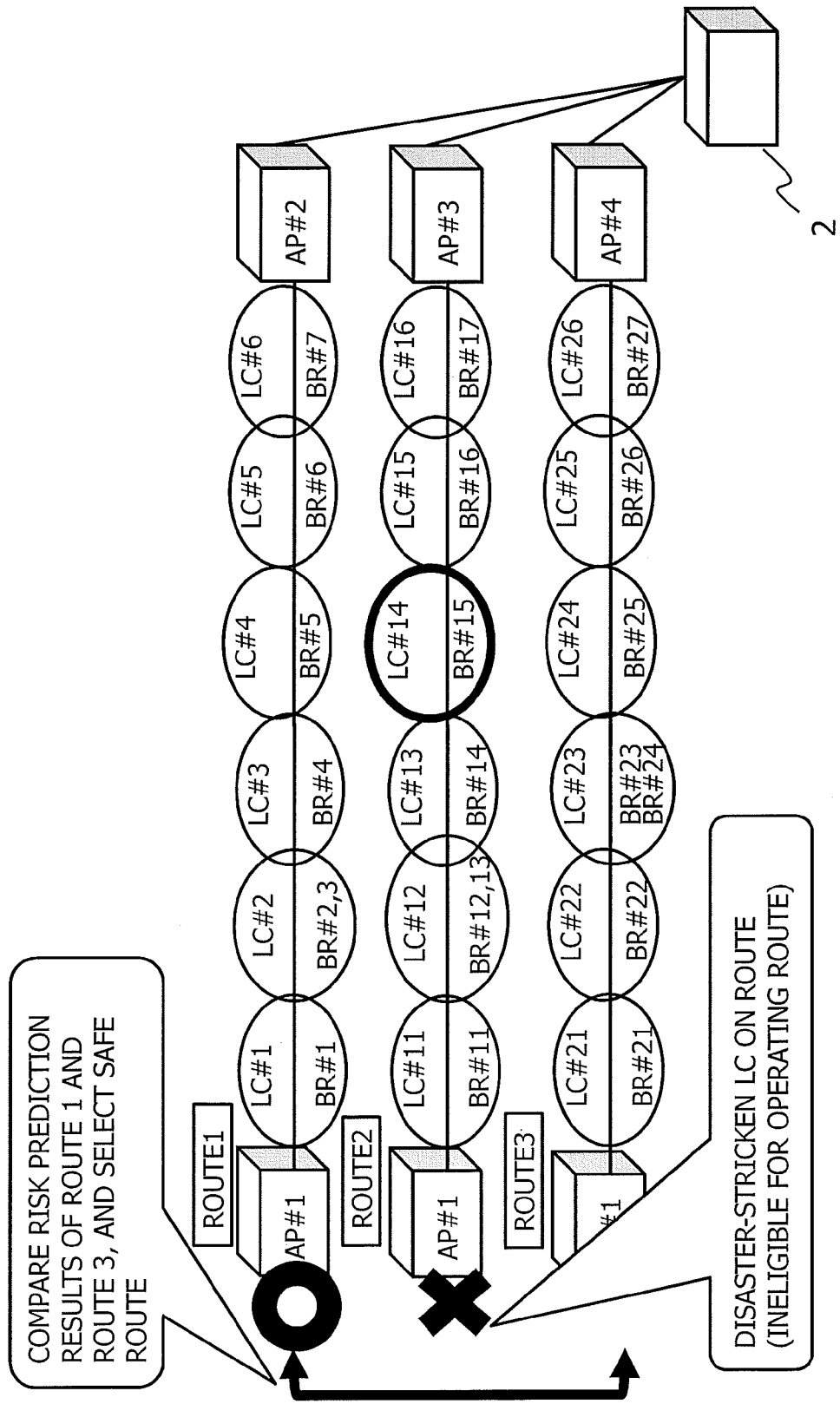
FIG. 7 is a diagram illustrating an example of route selection in a case where an own device belongs to an LC that is neither a disaster-stricken LC nor an affected LC.

FIG. 7 is a diagram illustrating an example of route selection in a case where the own device belongs to an LC that is neither the disaster-stricken LC nor the affected LC. FIG. 7 illustrates extracted three routes from the AP#1 in the wireless communication network system 100 illustrated in FIG. 4 to the monitoring operation server 2. A route 1 is a route from the AP#1 via the AP#2. The route 2 is a route from the AP#1 via the AP#3. The route #3 is a route from the AP#1 via the AP#4.

First, the route 2 includes a BR#15 on the route, which belongs to a disaster-stricken LC #14, and is thus excluded from a selection target. That is, the warning handling processing unit 11 first extracts the route 1 and the route 3 which do not include the AP 1 belonging to a disaster-stricken LC or an affected LC, on the routes.

Next, the warning handling processing unit 11 selects a route from between the route 1 and the route 3, which has less possibility of being influenced by an avalanche. Therefore, the warning handling processing unit 11 calculates the possibility of the occurrence of an avalanche with respect to the route 1 and the route 3. The calculation of the occurrence of an avalanche is also called risk prediction. The warning handling processing unit 11 compares risk prediction results between the route 1 and the route 3, and selects a safer route. In the example illustrated in FIG. 7, the route 1 is selected as an operating route through the comparison of the risk prediction results. The risk prediction will be described in detail hereafter.

Next, information stored in the databases will be described. In the first embodiment, the databases each hold the information in the form of a table. Note that the configurations of the tables stored in the databases to be described below are an example, and the configurations of the tables stored in the databases are not limited to those to be described below.

FIG. 8 is an example of a position information/LC management table that is held in the position information/LC management DB 12. The position information/LC management table stores information on the LCs found in the wireless communication network system 100. All the APs 1 in the wireless communication network system 100 hold the position information/LC management table of the same content. The position information/LC management tables are built in advance by an administrator of the wireless communication network system 100, and for example, are input into the APs 1 directly or through monitoring operation server 2 to be held. In addition, the position information/LC management tables are updated by the administrator when the configuration of the LCs is changed in the wireless communication network system 100.

In the position information/LC management table, identification information (LC-ID) on the LCs in the wireless communication network system and information on the latitudes and the longitudes of the LCs are associated with each other and stored. Since it is assumed that the shape of the LCs is a rectangle in the first embodiment, a latitude and a longitude representing two vertices on the diagonal of the rectangle of the LC may be stored in the position information/LC management table. Specifically, a latitude and a longitude of a vertex having, for example, a smaller latitude between the two vertices on the diagonal of the rectangle of the LC are stored as a latitude 1 and a longitude 1, respectively. A latitude and a longitude of a vertex having a larger latitude between the two vertices on the diagonal of the rectangle of the LC are stored as a latitude 2 and a longitude 2, respectively. The position information/LC management table is an example of a "first storage unit."

FIG. 9 is an example of a risk information management table that is held in the risk information management DB 13. The risk information management table is a table to define ranges of influence in accordance with the values of degrees of risks contained in an avalanche warning message. The risk information management table is, for example, issued for each LC by government and municipal offices such as the Ministry of Land, Infrastructure, Transport and Tourism or the avalanche predicting system 3 on a predetermined cycle, and updated through the avalanche predicting system 3 or the monitoring operation server 2. That is, different risk information management tables are held in the LCs to which the AP 1 belongs.

In the risk information management table, in the first embodiment, a degree of risk, the number of affected LCs, and a direction are associated with one another and stored. For example, a direction is expressed by a code. For example, in a case of an entry illustrated in FIG. 9 having a degree of risk=0.1, the number of affected LCs=1, and a direction=001 (south), where a degree of risk contained in an avalanche warning message is 0.1, it means that one LC adjacent to the own device southward becomes an affected LC.

FIG. 10 is an example of the AP-LC management table that is held in the AP-LC management DB 14. The AP-LC management table holds the whereabouts LC of an own AP 1. The AP-LC management table is set by an administrator in advance. In addition, when the disposition of the own AP 1 is changed, the value of the whereabouts LC in the AP-LC management table is updated through the monitoring operation server 2 or by directly inputting into the AP 1, for example.

In the first embodiment, in the AP-LC management table, identification information (AP-ID) on an own AP 1 and identification information on an LC to which the own AP 1 belongs are associated with each other and stored.

FIG. 11 is an example of the disaster-stricken LC/affected LC management table that is held in the disaster-stricken LC/affected LC management DB 15. The disaster-stricken LC/affected LC management table is a table holding information on a disaster-stricken LC and an affected LC that the warning handling processing unit 11 calculates when an AP 1 receives an avalanche warning message. The disaster-stricken LC/affected LC management table is, for example, vacant in an initial state, is brought into the initial state whenever an avalanche warning message is received, and stores the information on the calculated disaster-stricken LC and affected LC.

In the first embodiment, in the disaster-stricken LC/affected LC management table, identification information (disaster-stricken LC-ID) on a disaster-stricken LC and identification information on an affected LC to be influenced by an avalanche that occurs in the disaster-stricken LC (affected LC-ID) are associated with each other and stored. If there are a plurality of disaster-stricken LCs, an entry is created for each disaster-stricken LC.

FIG. 12 is an example of the AP/BR route management table that is held in the AP/BR route management DB 16. The AP/BR route management table is a table that holds all the routes from the own device to a destination. In the first embodiment, the AP/BR route management table holds all the routes from the own device to the monitoring operation server 2. The routes to the destination may be, for example, statically set and input by a system administrator, or dynamically calculated under a routing protocol of wireless communication. The AP/BR route management table is built and held in each AP, and updated whenever the route is changed.

In the AP/BR route management table illustrated in FIG. 12, identification information on a route (route ID), the status of the route (Status), the number of LCs to pass through (N), information on each LC on the route (hop X), and the ID of an AP to be an end of the wireless communication (end AP) are associated with one another and stored. With respect to the state of a route, for example, a Status=0 indicates that the route is a route in operation. A Status not being zero means that the route is a backup route. Furthermore, for example, the Status may be adapted such that the Status having a smaller value indicates a higher degree of priority to be selected as an operating route.

The information on LCs on a route contains, for example, the IDs of the LCs, the number of APs 1 located in the LCs, and the IDs of the APs 1 located in the LCs. The ID of the AP 1 is denoted by, in the first embodiment, an AP#X when the AP 1 operates as an access point. When the AP 1 operates as a bridge, the ID of the AP 1 is denoted by a BR#X.

FIG. 13 is an example of the route-without-disaster-stricken LC/risk calculation result management table that is held in the route-without-disaster-stricken LC/risk calculation result management DB 17. The route-without-disaster-stricken LC/risk calculation result management table is a table that stores an association between a route including no AP 1 belonging to a disaster-stricken LC and an affected LC, and the information indicating the possibility of the occurrence of an avalanche on the route, which are calculated when an AP 1 receives an avalanche warning message. The route including no AP 1 belonging to a disaster-stricken LC to an affected LC is also referred to as a safe route.

The route-without-disaster-stricken LC/risk calculation result management table is, for example, constructed and held by each AP 1. In addition, the route-without-disaster-stricken LC/risk calculation result management table is vacant in the initial state, and is brought into the initial state whenever an avalanche warning message is received, and stores the calculated safe route and information indicating the possibility of the occurrence of an avalanche on the route.

In the route-without-disaster-stricken LC/risk calculation result management table illustrated in FIG. 13, as information indicating the possibility of the occurrence of an avalanche on a route, a maximum risk prediction value is used. The calculation of the maximum risk prediction value will be described in detail hereafter.

FIG. 14 is an example of the switching risk threshold value management table that is held in the switching risk threshold value management DB 18. The switching risk threshold value management table stores a switching risk threshold value being a threshold value of information indicating the possibility of the occurrence of an avalanche that is used when a route to operate is selected from among safe routes. In the route-without-disaster-stricken LC/risk calculation result management table in FIG. 13, the maximum risk prediction value is used as the information indicating the possibility of the occurrence of an avalanche. For this reason, the switching risk threshold value management table illustrated in FIG. 14 stores the threshold value of the maximum risk prediction value as the switching risk threshold value. The switching risk threshold value management table is held by the APs 1. In addition, the switching risk threshold value management table is set by the system administrator in advance, and is updated when the system administrator changes the value of the switching risk threshold value.

FIG. 15 is an example of the landform information management table that is held in the landform information management DB 19. The landform information management table stores information each indicating the possibility of the occurrence of an avalanche or the possibility of being influenced by the avalanche which is calculated based on both dynamically changing avalanche-occurrence factors and static avalanche-occurrence factors, for all the LCs included in the wireless communication network system 100. The information indicating the possibility of the occurrence of an avalanche or of the possibility of being influenced by the avalanche for the LCs calculated based on the dynamically changing avalanche-occurrence factors is, hereafter, referred to as an LC risk hereafter. The information indicating the possibility of the occurrence of an avalanche or of being influenced by the avalanche for the LCs calculated based on the static avalanche-occurrence factors is, hereafter, referred to as a landform risk.

In the first embodiment, the LC risk and the landform risk are used to calculate the information indicating the possibility of the occurrence of an avalanche on each route, and indicate that the greater the values are, the higher the risks thereof are. The LC risk and the landform risk are, in the first embodiment, calculated by the monitoring operation server 2 on a predetermined cycle. Regardless of this, however, the LC risk and the landform risk may be calculated by the avalanche predicting system 3. The landform information management table is transferred from the monitoring operation server 2 to the APs 1, and held by the APs 1. Then, the LC risk and the landform risk are updated on a predetermined cycle that is calculated by the monitoring operation server 2. The LC risk is an example of a "first risk." The landform risk is an example of a "second risk."

In the example illustrated in FIG. 15, the LC risk takes on values ranging from 1.0 to 21 by a unit of 1.0. The landform risk takes on values ranging from 1.0 to 20 by a unit of 1.0. The LC risk and the landform risk will be described in detail hereafter.

(Configuration of Monitoring Operation Server)

The monitoring operation server 2 is, for example, a dedicated computer or a generalized computer. The hardware configuration of the monitoring operation server 2 includes a CPU, a ROM, a RAM, an auxiliary storage device, and a network interface, which are a bus electrically connected to. The details thereof overlap with those of the AP 1, and thus the description will be omitted. In addition, the monitoring operation server 2 may include an input device such as a keyboard, and an output device such as a display.

The monitoring operation server 2 has a network monitoring program and a risk calculating program in the auxiliary storage device. The network monitoring program is a program that monitors the connection conditions of the APs 1 in the wireless communication network system 100. The risk calculating program is a program that calculates the LC risks and the landform risks of the LCs in the wireless communication network system 100.

Figure 16:
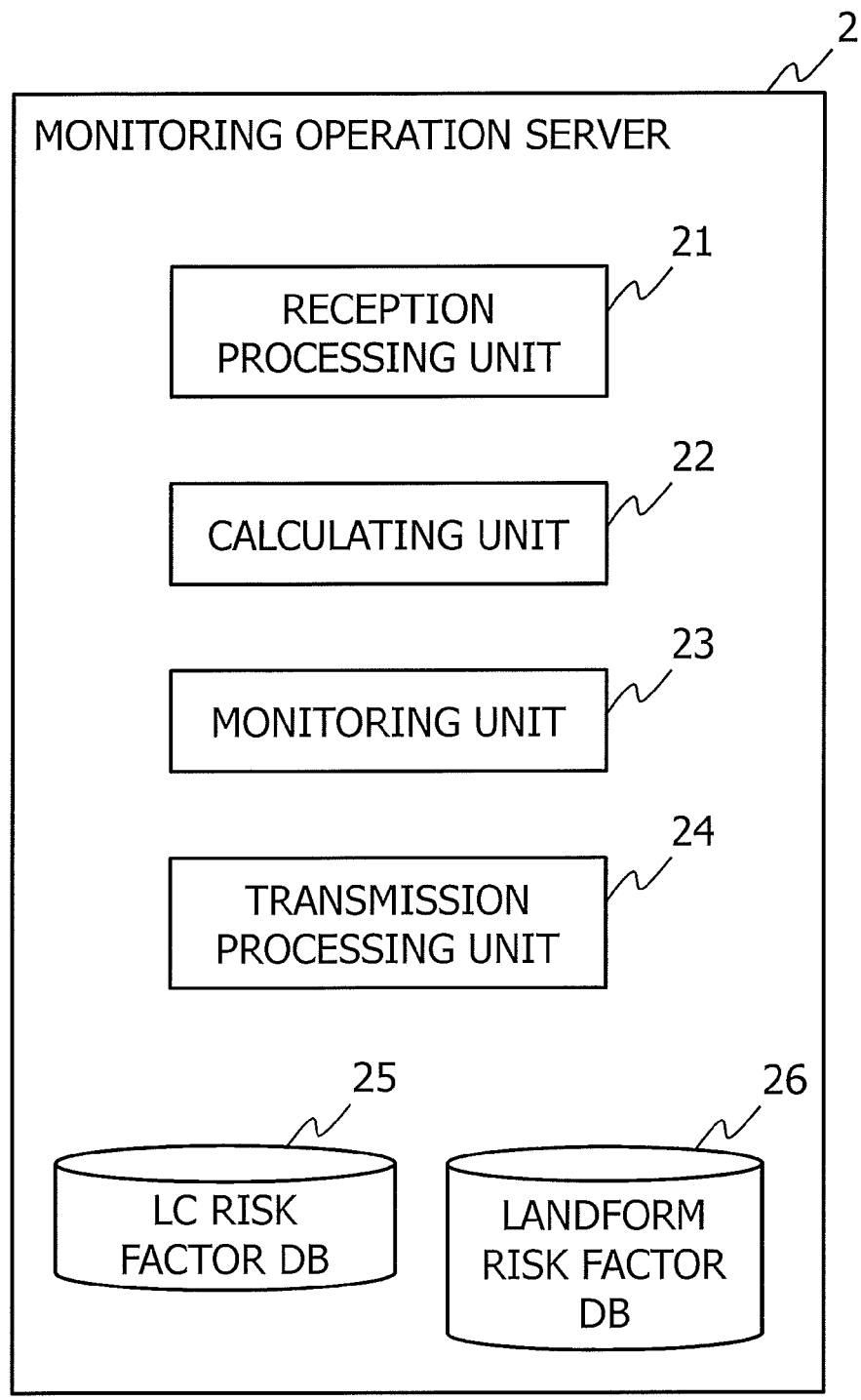
FIG. 16 is a diagram illustrating an example of the functional configuration of a monitoring operation server.

FIG. 16 is a diagram illustrating an example of the functional configuration of the monitoring operation server 2. The monitoring operation server 2 includes, as functional blocks, a reception processing unit 21, a calculating unit 22, a monitoring unit 23, a transmission processing unit 24, an LC risk factor DB 25, and a landform risk factor DB 26. At least a part of the processing units of the monitoring operation server 2 in an example illustrated in FIG. 16 may be a hardware circuit.

The reception processing unit 21 and the transmission processing unit 24 are each one of the function of the OS, and is an interface between the OS or middleware, and the application programs of the network monitoring program and the risk calculating program or the like.

The monitoring operation server 2 causes the CPU to execute the network monitoring program to perform the process in the monitoring unit 23. The monitoring unit 23 performs, for example, a fault detecting process in the wireless communication network system 100 on a predetermined cycle. Specifically, the monitoring unit 23 transmits a keep-alive confirmation message to APs 1 on the predetermined cycle, and receives response messages from the APs 1 to confirm the connection states of the APs 1. If there is any AP 1 that receives no response message, the monitoring unit 23 detects the occurrence of a fault in the AP 1.

Note that the fault detecting process by the monitoring unit 23 is not limited to this. For example, the APs 1 may transmit keep-alive messages to the monitoring operation server 2 on the predetermined cycle, and the monitoring unit 23 may detect a fault occurrence in an AP 1 from which the reception of a keep-alive is stopped. In this case, the monitoring unit 23 detects, for example, a fault occurrence in the AP 1 if a keep-alive is not received after a period of time three times as long as a transmission interval of keep-alives elapses from the last reception of a keep-alive.

Upon detecting a fault occurrence, the monitoring unit 23 transmits a fault occurrence message to all the APs 1 in the wireless communication network system 100. In addition, upon receiving an avalanche warning message from the avalanche predicting system 3 through the reception processing unit 21, the monitoring unit 23 copies the avalanche warning message and transmits it to all the APs 1 in the wireless communication network 100 through the transmission processing unit 24.

The monitoring operation server 2 causes the CPU to execute the risk calculating program to perform the process in the calculating unit 22. The calculating unit 22 obtains, for example, the values of dynamic change factors of each LC from APs 1 connected to temperature sensors, an external meteorological observation system, and the like through the reception processing unit 21, and stores the values in the LC risk factor DB 25.

The calculating unit 22 calculates the LC risks and the landform risks of all the LCs in the wireless communication network system 100 based on information stored in the LC risk factor DB 25 and the landform risk factor DB 26, on a predetermined cycle. The predetermined cycle is, for example, set by the hour or by the day. Note that since the landform risk is a value based on the static factors, the landform risk may be calculated not on the predetermined cycle but in a case where a landform risk factor is changed. The calculating unit 22 transmits the calculated LC risks and landform risks of all the LCs to all the APs 1 through the transmission processing unit 24.

FIG. 17 is an example of the LC risk factor table that is held in the LC risk factor DB 25. The LC risk factor DB 25 is, for example, created in the storage area in the auxiliary storage device when the risk calculating program is installed. In the LC risk factor table, dynamically changing factors of the occurrence of an avalanche in an LC and an evaluation score of the factors for each rank are stored. The dynamically changing occurrence factors of an avalanche in an LC include, for example, the amount of temperature change (the degree of temperature change), a precipitation, a snow accumulation, a wind velocity, the depth of snow (snow depth), the quality of snow due to snowing (change in snow quality), and the like.

The degree of temperature change is the amount of change in temperature measured on a predetermined cycle from the previous measurement. In the example illustrated in FIG. 17, as the degree of temperature change, the average value of the degree of temperature change that is measured over the last one hour is used. The precipitation is, for example, a value obtained by dividing the volume of rain that falls at a measurement point during a predetermined period of time by the area of the measurement point, and is expressed in 0.5 millimeters. The snow accumulation is a value obtained by dividing the volume of snow that falls at the measurement point during the predetermined period of time by the area of the measurement point, and is expressed in centimeters.

Ranking the factors and the evaluation scores of the factors are set by the administrator of the wireless communication network system 100. Ranking the factor and the evaluation scores of the ranks for each factor are not limited to those illustrated in FIG. 17.

For example, the LC risk is calculated by multiplying the evaluation scores of the degree of temperature change, the precipitation, the snow accumulation, the wind velocity, the snow depth, and the change in snow quality. That is, the calculating unit 22 obtains observed values of the degree of temperature change, the precipitation, the snow accumulation, the wind velocity, the snow depth, the change in snow quality, in each LC from the APs 1 or the external meteorological observation system, obtains respective evaluation scores from the LC risk factor table and multiplies them to calculate the LC risk for each LC.

FIG. 18 is an example of the landform risk factor table that is held in the landform risk factor DB 26. The landform risk factor DB 26 is, for example, created in the storage area of the auxiliary storage device when the risk calculating program is installed. In the landform risk factor table, the static avalanche-occurrence factors, and the evaluation scores of the factors for each rank are stored. The static avalanche-occurrence factors include, for example, an incline, vegetation, and the like. The vegetation is a vegetable cover in the LC, that is, an inhabiting state of plants.

Ranking the factors and the evaluation scores of the factors are set by the administrator of the wireless communication network system 100. Ranking the factors and the evaluation scores of the ranks for each factor are not limited to those illustrated in FIG. 18.

For example, the landform risk is calculated by multiplying the evaluation scores of the incline and the vegetation. That is, the calculating unit 22 obtains the observed value of the incline and the vegetation of each LC from the input by the system administrator or an external system and the like, obtains the respective evaluation scores from the landform risk factor table, and multiplies them to calculate the landform risk for each LC.

<Flow of Process>

Figure 19A:
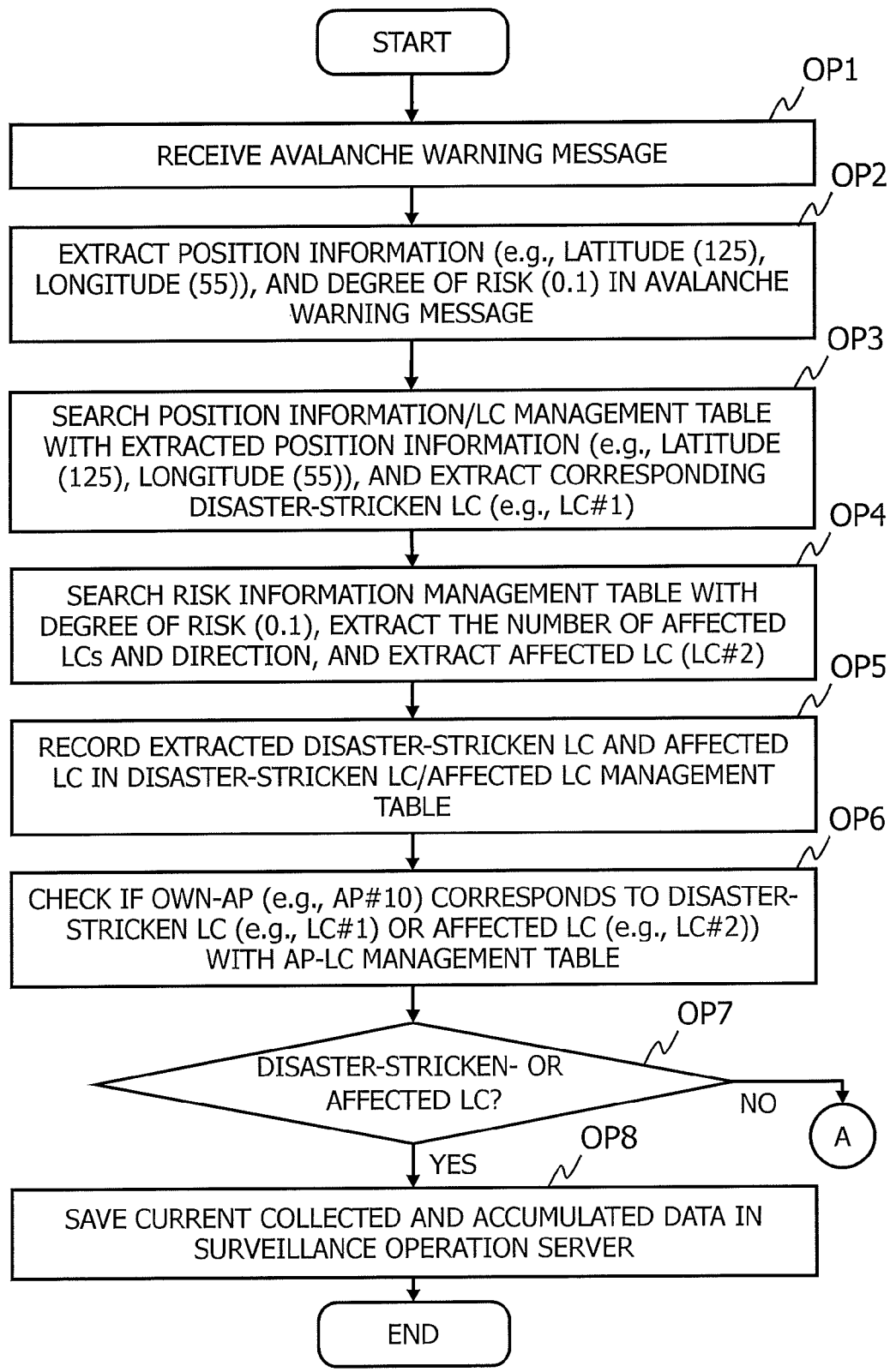
FIG. 19A is an example of a flow chart of an avalanche warning handling process in the AP.
Figure 19B:
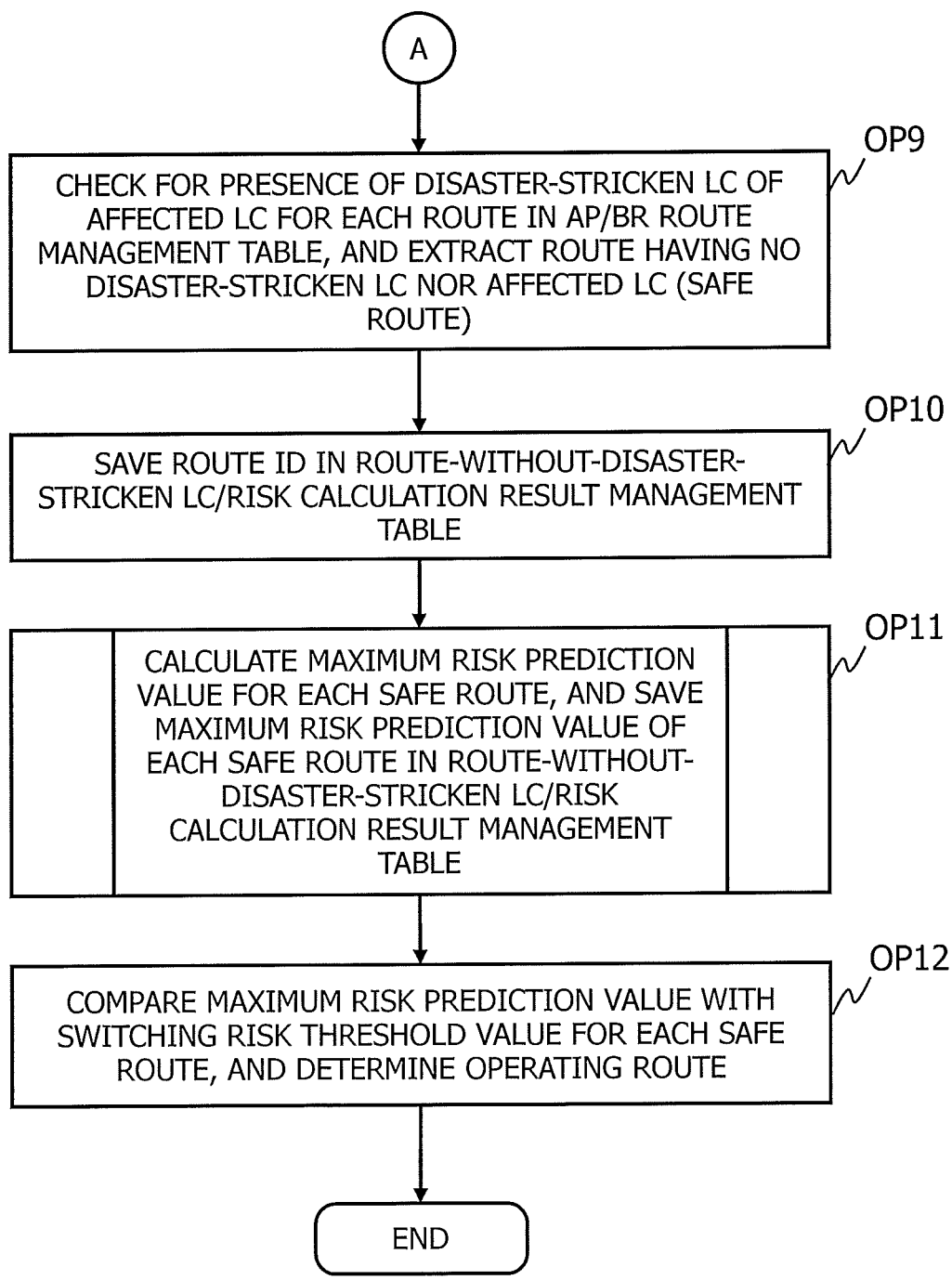
FIG. 19B is the example of the flow chart of the avalanche warning handling process in the AP.

FIG. 19A and FIG. 19B are an example of a flow chart of the avalanche warning handling process in the AP 1. The flow charts illustrated in FIG. 19A and FIG. 19B are started with the start of the AP 1, and repeatedly performed during the operation of the AP 1.

In OP1, the warning handling processing unit 11 receives an avalanche warning message from the monitoring operation server 2 through the reception processing unit 111. The process next proceeds to OP2.

In OP2, the warning handling processing unit 11 extracts position information and a degree of risk from the avalanche warning message. For example, assume that a latitude of 125° and a longitude of 55° as position information, and a degree of risk of 0.1 are extracted from the avalanche warning message. The process next proceeds to OP3.

In OP3, the warning handling processing unit 11 searches the position information/LC management table with the position information extracted from the avalanche warning message, and extracts an LC corresponding to the position information, that is, a disaster-stricken LC. For example, when the position information/LC management table illustrated in FIG. 8 is searched with the latitude of 125° and the longitude of 55° as the position information, the warning handling processing unit 11 extracts an LC#1 as the disaster-stricken LC. The process next proceeds to OP4.

In OP4, the warning handling processing unit 11 searches the risk information management table with the degree of risk extracted from the avalanche warning message, extracts the number of affected LCs and a direction, and extracts corresponding LCs as affected LCs. For example, when the risk information management table illustrated in FIG. 9 is searched with a degree of risk of 0.1, the warning handling processing unit 11 extracts one as the number of affected LCs, and 001 (south) as the direction. For example, in the case of the network configuration illustrated in FIG. 4, an LC#2 positioned being adjacent to a disaster-stricken LC #1 southward is extracted as an affected LC. The process next proceeds to OP5.

In OP5, the warning handling processing unit 11 saves the extracted disaster-stricken LC and affected LC in the disaster-stricken LC/affected LC management table. The process next proceeds to OP6.

In OP6, the warning handling processing unit 11 compares a belonging LC of the own AP 1 held in the AP-LC management table with the disaster-stricken LC and the affected LC held in the disaster-stricken LC/affected LC management table. The process next proceeds to OP7.

In OP7, the warning handling processing unit 11 determines whether or not the belonging LC of the own AP 1 is the disaster-stricken LC or the affected LC. If the belonging LC of the own AP 1 is the disaster-stricken LC or the affected LC (OP7: YES), the process proceeds to OP8. If the belonging LC of the own AP 1 is neither the disaster-stricken LC nor the affected LC (OP7: NO), the process proceeds to OP9.

For example, in a case where the own AP 1 is the AP#10 and the belonging LC is the LC#2 based on the AP-LC management table illustrated in FIG. 10, the belonging LC #2 of the own AP 1 is the affected LC #2, and thus in this case the process proceeds to OP8. For example, in a case of the AP#1 in the network illustrated in FIG. 4, the belonging LC of the own AP 1 is neither the disaster-stricken LC nor the affected LC, and thus the process proceeds to OP9.

OP8 is a process performed when the belonging LC of the own AP 1 is a disaster-stricken LC or an affected LC. In OP8, the warning handling processing unit 11 reads data in the collected data management DB 122, and transmits it to the monitoring operation server 2 through the transmission processing unit 112 to save it in the monitoring operation server 2. Subsequently, the process illustrated in FIG. 19A is finished.

OP9 to OP12 are a process performed when the belonging LC of the own AP 1 is neither a disaster-stricken LC nor an affected LC. In OP9, the warning handling processing unit 11 extracts at least one safe route including no LC held in the disaster-stricken LC/affected LC management table as a disaster-stricken LC or an affected LC from among routes held in the AP/BR route management table. The process next proceeds to OP10.

In OP10, the warning handling processing unit 11 saves the route ID of the extracted safe routes in the route-without-disaster-stricken LC/risk calculation result management table. The process next proceeds to OP11.

In OP11, the warning handling processing unit 11 calculates a maximum risk prediction value for each extracted safe route, and saves the maximum risk prediction values of the safe routes in the route-without-disaster-stricken LC/risk calculation result management table. The calculation of the maximum risk prediction value will be described in detail hereafter. The process proceeds to OP12.

In OP12, the warning handling processing unit 11 compares, for each safe route, the maximum risk prediction value stored in the route-without-disaster-stricken LC/risk calculation result management table with the switching risk threshold value stored in the switching risk threshold value management table. As a result of the comparison, the warning handling processing unit 11 selects a route having a maximum risk prediction value smaller than the switching risk threshold value as an operating route. When there are a plurality of routes having maximum risk prediction values smaller than the switching risk threshold value, for example, the warning handling processing unit 11 may select a route having the smallest maximum risk prediction value as an operating route, or may randomly select the operating route. Subsequently, the process illustrated in FIG. 19B is finished.

Note that, when the route in operation is changed through the process of OP12, the warning handling processing unit 11 updates the status of the route (Status) in the AP/BR route management table (refer to FIG. 12).

Figure 20:
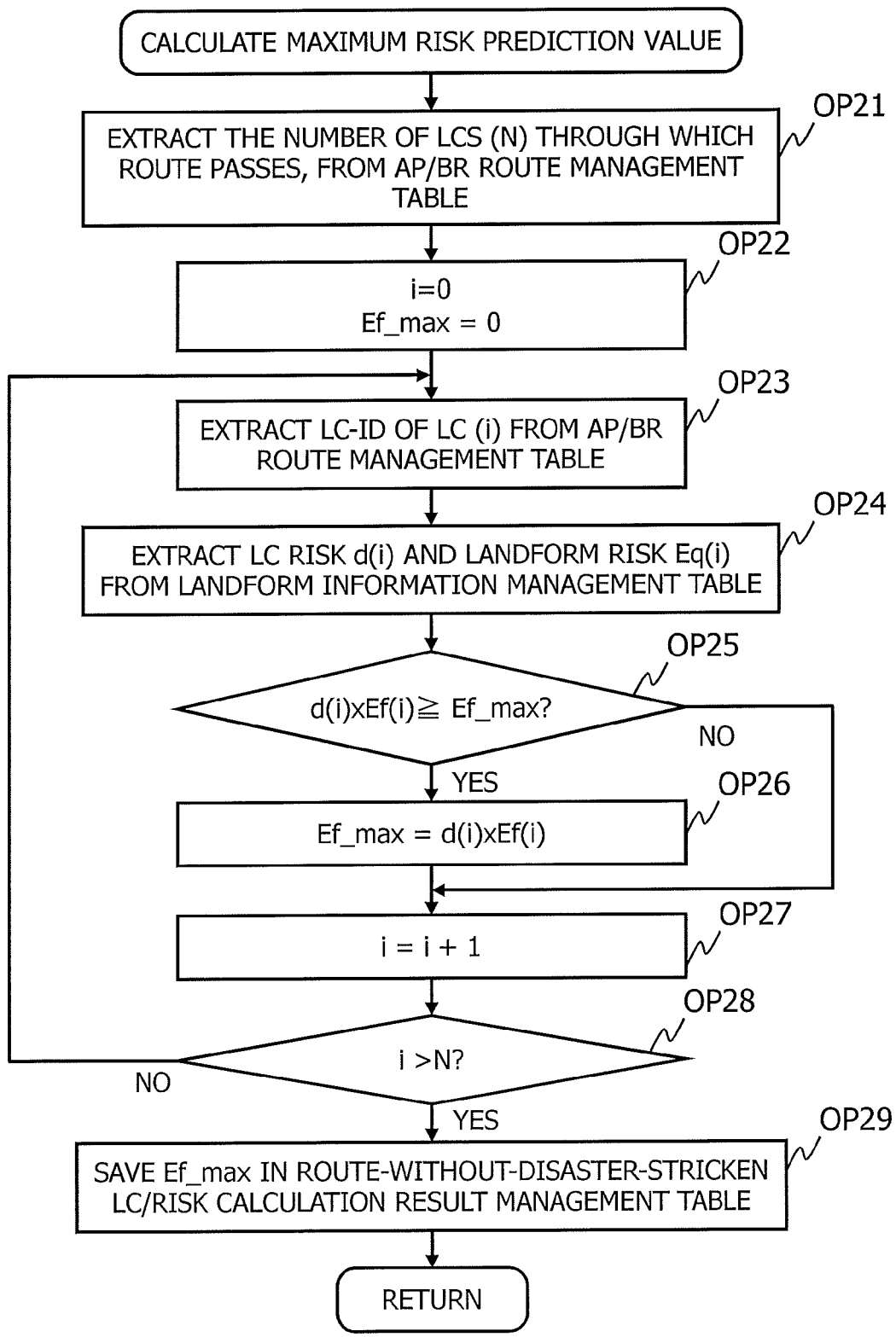
FIG. 20 is an example of a flow chart of a process to calculate the maximum risk prediction value of a safe route.

FIG. 20 is an example of a flow chart of a process to calculate the maximum risk prediction value of a safe route. The flow chart illustrated in FIG. 20 corresponds to the process in OP11 in FIG. 19B. The process illustrated in FIG. 20 is performed for each route held in the AP/BR route management table.

In OP21, the warning handling processing unit 11 extracts the number of LCs (N) through which a target route passes through, from the AP/BR route management table. The process next proceeds to OP22.

In OP22, the warning handling processing unit 11 sets variables i and Ef_max at zero, being initial values thereof. The variable i is a variable that indicates an LC on a route, and the variable i=0 represents the belonging LC of the own AP. As the variable i is incremented by one, the variable i comes to indicate an LC forward in a direction toward an AP to be an end of the wireless communication up to the monitoring operation server 2. The variable i=N represents a belonging LC of the AP to be the end of the wireless communication up to the monitoring operation server 2. The Ef_max is a maximum risk prediction value. The process next proceeds to OP23.

In OP23, the warning handling processing unit 11 extracts the LC-ID of an LC(i) on a target route in the AP/BR route management table. The LC(i) indicates an LC that is passed through in the i-th order on the target route. The process next proceeds to OP24.

In OP24, the warning handling processing unit 11 extracts an LC risk d(i) and a landform risk Eq(i) from the landform information management table. The LC risk d(i) indicates the LC risk of the LC(i) that is passed through on the target route in the i-th order. The landform risk Eq(i) indicates landform risk of the LC(i) that is passed through on the target route in the i-th order. The process next proceeds to OP25.

In OP25, the warning handling processing unit 11 determines whether or not the result of multiplying the LC risk d(i) by the landform risk Eq(i) is greater than the maximum risk prediction value Ef_max. Here, both of the LC risk and the landform risk are positive numbers, greater values of which indicate higher risks, and thus the result of multiplication having a greater value indicates a higher risk.

When the result of multiplying the LC risk d(i) by the landform risk Eq(i) is equal to or greater than the maximum risk prediction value Ef_max (OP25: YES), the process proceeds to OP26, and in OP26, the maximum risk prediction value Ef_max is updated to the result of multiplying the LC risk d(i) by the landform risk Eq(i). When the result of multiplying the LC risk d(i) by the landform risk Eq(i) is less than the maximum risk prediction value Ef_max (OP25: NO), the maximum risk prediction value Ef_max is not updated, and the process proceeds to OP27.

In OP27, the warning handling processing unit 11 adds one to the variable i. The process next proceeds to OP28.

In OP28, the warning handling processing unit 11 determines whether or not the variable i is greater than the number of LCs (N) that the target route passes through. When the variable i is greater than the number of LCs (N) that the target route passes through (OP28: YES), it means that the process is finished for all the LCs on the target route, and the process proceeds to OP29. When the variable i is equal to or less than the number of LCs (N) that the target route passes through (OP28: NO), it means that there is at least one LC on the target route that has not been subjected to the process yet, the process proceeds to OP23, and the process is performed on the next LC.

In OP29, the warning handling processing unit 11 stored the value of the maximum risk prediction value Ef_max in the route-without-disaster-stricken LC/risk calculation result management table. Subsequently, when the process illustrated in FIG. 20 is finished and the maximum risk prediction values have been calculated for all the routes in the AP/BR route management table, the process proceeds to OP12 in FIG. 19B.

Now, in the example illustrated in FIG. 20, the maximum value of the results of multiplying the LC risks d(i) by the landform risks Eq(i) of the LCs on the route are calculated as the maximum risk prediction value, and the maximum risk prediction value is used as information indicating the possibility of the occurrence of an avalanche. However, the information indicating the possibility of the occurrence of an avalanche is not limited to this. For example, the information indicating the possibility of the occurrence of an avalanche may be the sum of the results of multiplying the LC risks d(i) by the landform risks Eq(i) for all the LCs on the route.

Advantageous Effects of First Embodiment

In the first embodiment, upon receiving an avalanche warning message, the APs 1 autonomously perform the avalanche warning handling process. That is, the APs 1 each autonomously calculate a disaster-stricken LC and an affected LC from the avalanche warning message, and determines whether or not the belonging LC of the own AP is the disaster-stricken LC or the affected LC. An AP that belongs to an LC being the disaster-stricken LC and the affected LC saves data on a sensor, log data, and the like that are collected and accumulated in the monitoring operation server 2. It is thereby possible to save the data in a safe place as of the reception of an avalanche warning message, before the occurrence of the avalanche, and to reduce the possibility of the disappearance of the data. In addition, since the data held in a volatile memory such as a RAM is transmitted to the monitoring operation server 2 as of the reception of the avalanche warning message, it is possible to reduce the possibility of the disappearance due to the avalanche.

An AP belonging to an LC that is neither a disaster-stricken LC nor an affected LC searches for a route having a low possibility of the occurrence of an avalanche, and selects a route having a lower possibility of the occurrence of an avalanche as an operating route. It is thereby possible to switch to a safer route before the occurrence of an avalanche or shortly after the occurrence of an avalanche, which enables reducing the possibility of the interruption of communication due to the occurrence of the avalanche.

In addition, at the time of searching for a route having a low possibility of the occurrence of an avalanche, using the maximum risk prediction value based on dynamically changing factors and static factors in LCs enables obtaining information indicating the possibility of the occurrence of an avalanche with high precision.

Therefore, according to the first embodiment, it is possible to limit the influence of the occurrence of an avalanche in the wireless communication network to a minimum.

According to the disclosed wireless communication device, wireless communication network system, information processing method, and information processing program, it is possible to reduce, in the occurrence of a natural disaster, the influence of the disaster in the wireless communication network system.

Other Embodiments

Although the first embodiment has been described taking an avalanche as the example of natural disasters, the applications of the technique described in the first embodiment that restrains the influence of a natural disaster on the wireless communication network are not limited to an avalanche. The technique can apply to, for example, flood, earthquake, and the like by setting the parameters such as the degree of risk, the LC risk, and the landform risk to those appropriate for a target natural disaster.

In the first embodiment, although an AP 1 belonging to an LC that is either a disaster-stricken LC or an affected LC saves data in the monitoring operation server 2, the destination location to save the data is not limited to the monitoring operation server 2. The destination location may be a device as long as the device is positioned at a place that is not influenced by the target natural disaster and the device can communicate with APs 1.

Although the first embodiment has been described on the assumption that the wireless communication network is constructed by Wi-Fi, the applications of the technique described in the first embodiment are not limited to wireless communication networks constructed by Wi-Fi. For example, the technique described in the first embodiment can apply to wireless communication networks constructed by any other wireless communication techniques such as WiMax.

In the first embodiment, the APs 1 determine a disaster-stricken LC and an affected LC. Regardless of this, however, the monitoring operation server 2 may determine a disaster-stricken LC and an affected LC. For example, the monitoring operation server 2 may include a database storing the belonging LCs of the APs 1 and the position information/LC management DB 12, and may instruct an AP 1 that belongs to the disaster-stricken LC and the affected LC to save data in the monitoring operation server 2. In addition, the monitoring operation server 2 may search for a route having a low possibility of the occurrence of an avalanche, select the route as an operating route, and instruct the APs 1 to change the operating routes thereof.

One of the other aspects of the present embodiment is a wireless communication network system including the plurality of above-described wireless communication device. In addition, one of the other aspects of the present embodiment is an information processing method by which the wireless communication device performs the above-described process. In addition, the other aspects of the present embodiment can include a program that causes a computer to function as the above-described wireless communication device, and a non-transitory computer readable recording medium that records the program. The non-transitory recording medium readable by a computer or the like refers to a recording medium capable of accumulating information such as data or program through electrical, magnetic, optical, mechanical, or chemical actions, which can be read by the computer or the like.

All examples and conditional language provided herein are intended for the pedagogical purposes of aiding the reader in understanding the invention and the concepts contributed by the inventor to further the art, and are to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless communication device in a wireless communication network system that includes a plurality of wireless communication devices connected to one another by wireless communication, inside of the system being divided into zones each having a predetermined geographic area, the wireless communication device comprising:
    a processing unit that, upon receiving a disaster warning message including predicted position information on an occurrence source of a disaster and disaster-influencing information indicating an area to be influenced by the disaster, calculates a disaster-stricken zone including the occurrence source based on the predicted position information, and an affected zone to be influenced by the disaster based on the disaster-influencing information, and performs any one of a process to transfer data that an own device has, and a process to change a transfer route from the own device to a destination device, according to a relationship between a zone in which the own device is positioned, and the disaster-stricken zone and the affected zone.

2. The wireless communication device according to claim 1, further comprising
    a first storage unit that holds position information on zones in the wireless communication network system, wherein
    the processing unit calculates a disaster-stricken zone and an affected zone in the wireless communication network system based on the position information on the zones, the predicted position information on the occurrence source, and the disaster-influencing information.

3. The wireless communication device according to claim 1, further comprising
    a second storage unit that holds predetermined data, wherein
    when a zone in which the own device is positioned is the disaster-stricken zone or the affected zone, the processing unit transfers the predetermined data to a predetermined device positioned in a zone that is not influenced by the disaster for saving the data, as the process to transfer the data.

4. The wireless communication device according claim 1, wherein
    when the zone in which the own device is positioned is neither the disaster-stricken zone nor the affected zone, the processing unit searches for a safe route that does not pass through the disaster-stricken zone nor the affected zone from among routes to a destination device, as the process to change the transfer route.

5. The wireless communication device according to claim 4, wherein
    when there are a plurality of the safe routes, the processing unit calculates information indicating a possibility of a disaster for each safe route.

6. The wireless communication device according to claim 5, wherein the processing unit acquires the information indicating the possibility of the disaster for each of the safe routes, based on a first risk calculated from dynamic risk factors in the zones in the wireless communication network system and a second risk calculated from static risk factors in the zones in the wireless communication network system.

7. The wireless communication device according to claim 6, wherein
the processing unit calculates a maximum value of values obtained by multiplying the first risk by the second risk in zones on a route, as the information indicating the possibility of a disaster on the safe routes.

8. The wireless communication device according to claim 6, wherein
the first and second risks are each calculated by multiplying evaluation scores, which are given for each dynamic factor and static factor in a stepwise manner.

9. The wireless communication device according to claim 5, wherein
the processing unit selects an operating route from among safe routes each having the possibility of the disaster lower than a predetermined threshold value.

10. The wireless communication device according to claim 5, wherein
the processing unit selects a safe route having a lowest possibility of the disaster, as an operating route.

11. A wireless communication network system that includes a plurality of wireless communication devices connected to one another by wireless communication, inside of the system being divided into zones each having a predetermined geographic area, wherein
each wireless communication device comprises
a processing unit that, upon receiving a disaster warning message including predicted position information on an occurrence source of a disaster and disaster-influencing information indicating an area to be influenced by the disaster, calculates a disaster-stricken zone including the occurrence source based on the predicted position information, and an affected zone to be influenced by the disaster based on the disaster-influencing information, and performs any one of a process to transfer data that an own device has, and a process to change a transfer route from the own device to a destination device, according to a relationship between a zone in which the own device is positioned, and the disaster-stricken zone and the affected zone.

12. The wireless communication network system according to claim 11, further comprising
a server that calculates a first risk for each zone in the wireless communication network system based on dynamic risk factors, and calculates a second risk based on static risk factors, wherein
each wireless communication device further includes:
a first storage unit that holds position information on the zones in the wireless communication network system; and
a second storage unit that holds the first and second risks in the zones in the wireless communication network system, which are calculated by the server, wherein
the processing unit calculates a disaster-stricken zone and an affected zone in the wireless communication network system based on the position information on the zones, the predicted position information on the occurrence source, and the disaster-influencing information, when a zone in which the own device is positioned is neither the disaster-stricken zone nor the affected zone, with respect to a safe route that does not pass through the disaster-stricken zone nor the affected zone among routes to the destination device based on the first and second risks, calculates information indicating a possibility of a disaster on the safe route, and selects an operating route based on the information indicating the possibility of the disaster on the safe route, as the process to change the transfer route.

13. An information processing method in a wireless communication network system that includes a plurality of wireless communication devices connected to one another by wireless communication, inside of the system being divided into zones each having a predetermined geographic area, the information processing method executed by each of the plurality of wireless communication devices, comprising:
calculating when a disaster warning message including predicted position information on an occurrence source of a disaster and disaster-influencing information indicating an area to be influenced by the disaster is received, a disaster-stricken zone including the occurrence source based on the predicted position information, and an affected zone to be influenced by the disaster based on the disaster-influencing information, and performing any one of a process to transfer data that an own device has, and a process to change a transfer route from the own device to a destination device, according to a relationship between a zone in which the own device is positioned, and the disaster-stricken zone and the affected zone.

14. An non-transitory computer-readable recording medium recording information processing program in a wireless communication network system that includes a plurality of wireless communication devices connected to one another by wireless communication, inside of the system being divided into zones each having a predetermined geographic area, the information processing program causing the wireless communication devices to perform a process comprising:
calculating, when a disaster warning message including predicted position information on an occurrence source of a disaster and disaster-influencing information indicating an area to be influenced by the disaster has an influence is received, a disaster-stricken zone including the occurrence source based on the predicted position information, and an affected zone to be influenced by the disaster based on the disaster-influencing information, and performing any one of a process to transfer data that an own device has, and a process to change a transfer route from the own device to a destination device, according to a relationship between a zone in which the own device is positioned, and the disaster-stricken zone and the affected zone.

* * * * *